United States Patent Office 3,074,934
Patented Jan. 22, 1963

3,074,934
PRODUCTION OF 11β,17α-DIHYDROXY-1-METHYL-17β(1-OXO-2-HYDROXYETHYL) - 4 - ESTREN-3-ONE AND 11β,17α-DIHYDROXY - 1 - METHYL-17β(1 - OXO - 2 - HYDROXYETHYL)-4,6-ESTRADIENE-3-ONE AND ESTERS THEREOF
John M. Chemerda and Arthur E. Erickson, Metuchen, N.J., assignors to Merck & Co., Inc., Rahway, N.J., a corporation of New Jersey
No Drawing. Filed May 16, 1958, Ser. No. 735,706
10 Claims. (Cl. 260—239.55)

This application is a continuation-in-part of our copending application Serial No. 690,428, filed October 16, 1957, now abandoned.

This invention is concerned generally with novel steroid compounds and with processes of preparing the same. More particularly, it relates to 11β,17α - dihydroxy - 1-methyl-17β-(1-oxo-2-hydroxyethyl)-4-estren - 3 - one and 11β,17α-dihydroxy-1-methyl - 17β - (1-oxo-2-hydroxyethyl)-4,6-estradiene-3-one and esters thereof and to the processes of preparing these compounds. It is also concerned with the novel chemical compounds produced as intermediates in the synthesis.

The chemical compounds with which this invention is concerned, namely, 11β,17α-dihydroxy-1-methyl-17α-(1-oxo-2-hydroxyethyl)-4-estrene-3 - one and 11β,17α - dihydroxy-1-methyl-17β-(1-oxo-2-hydroxyethyl) - 4,6 - estradiene-3-one and esters thereof possess anti-inflammatory activity and are effective in the treatment of arthritis and related diseases.

In preparing our novel chemical compounds, we utilize as a starting material either 17α,21-diacetoxy-1,4-pregnadiene-3,11,20-trione or 17α,21-diacetoxy-1,4,6-pregnatriene-3,11,20-trione which may be represented by the following formula—

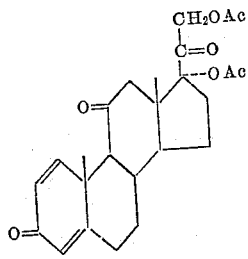

or

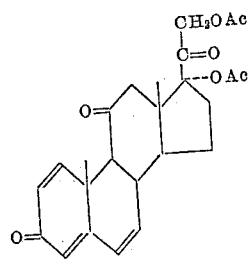

Either of the above compounds can be reacted with acetic anhydride, in the presence of acetic acid and zinc chloride, which is employed as a catalyst, to form 3,17α-diacetoxy-1-methyl-17β-(1-oxo - 2 - acetoxyethyl)-1,3,5(10)-estratrien-11-one or 3,17-diacetoxy - 1 - methyl-17β-(1-oxo-2-acetoxyethyl) - 1,3,5(10) - 6 - estratetraen-11-one, which may be identified by the formulae—

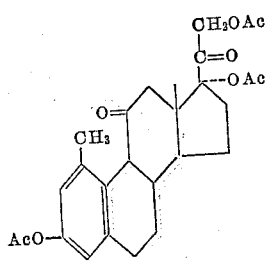

or

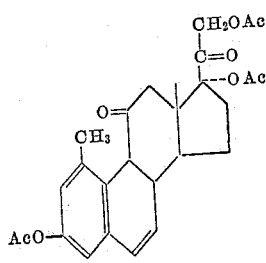

Upon hydrolysis of either one of the above compounds with sodium methylate in methanol, the acetyl groups are replaced by hydrogen in the 3, 17α, and 21 positions to yield 3,17α-dihydroxy-1-methyl-17β-(1 - oxo-2 - hydroxyethyl)-1,3,5(10)-estratrien-11-one or 3,17α-dihydroxy - 1-methyl-17β-(1-oxo-2-hydroxyethyl) - 1,3,5(10),6 - estratetraen-11-one which have the following structural formulae—

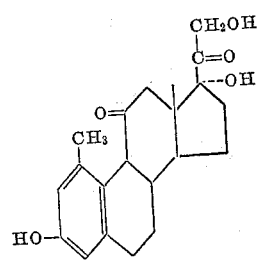

or

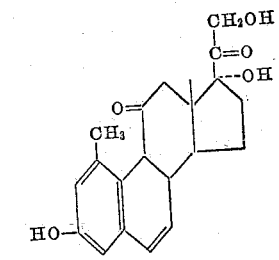

Reaction of either of the above compounds with diazomethane results in the substitution of a methoxy group for the hydroxy group in the 3-position, to form 17α-hydroxy-3-methoxy-1-methyl-17β-(1-oxo - 2 - hydroxyethyl)-1,3,5(10)-estratrien-11-one or 17α-hydroxy-3-methoxy-1-methyl-17β-(1-oxo-2 - hydroxyethyl) - 1,3,5(10),6- estratetraen-11-one which may be represented as follows—

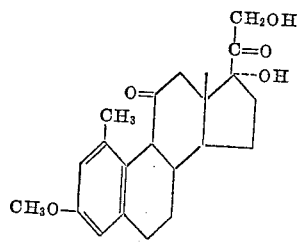

or

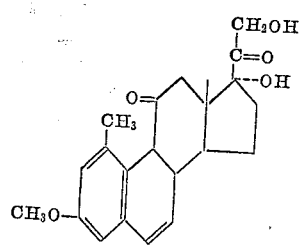

Treatment of either of the above compounds with semicarbazide yields 17α-hydroxy-3-methoxy-1-methyl-17β-(1-semicarbazono-2-hydroxyethyl) - 1,3,5(10) - estratrien-11-one or 17α-hydroxy-3-methoxy-1-methyl-17β-(1-semicarbazono-2-hydroxyethyl) - 1,3,5(10),6 - estratetrae-11-one which may be represented as follows:

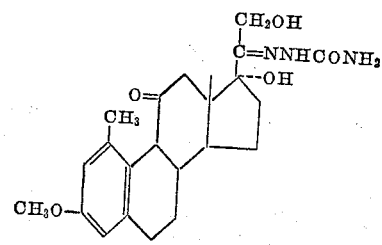

or

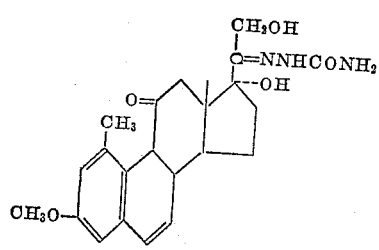

Upon reacting either of the above compounds with sodium borohydride and acidifying the reduction products, there is formed 11β,17α-dihydroxy - 3 - methoxy-1-methyl - 17β - (1 - oxo - 2 - hydroxyethyl) - 1,3,5(10)-estratriene or 11β,17α - dihydroxy - 3-methoxy-1-methyl-17β-(1-oxo-2 - hydroxyethyl) - 1,3,5(10),6 - estratetraen which have the structural formulae—

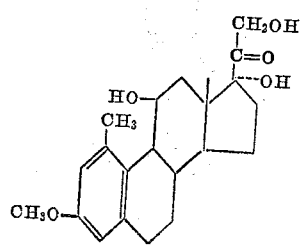

or

Treatment of the above compound with formalin results in the formation of 11β-hydroxy-3-methoxy-1-methyl-17,20,20,21 - bis - (dioxymethylene) - 1,3,5(10) - estratriene or 11β - hydroxy-3-methoxy-1-methyl-17,20,20,21-bis-(dioxymethylene)-1,3,5(10),6-estratetraen which may be represented by the following structural formula—

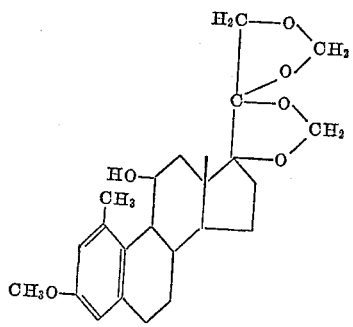

or

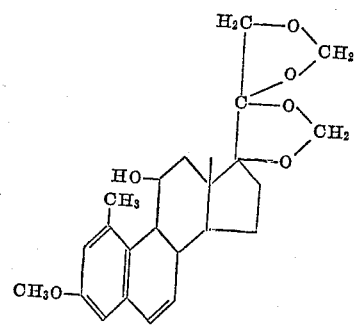

Either of the above-identified compounds is reduced with lithium and the residue reacted with formic acid to form 11β,17α-dihydroxy-1-methyl-17β-(1-oxo-2-hydroxyethyl)-4-estren-3-one or 11β,17α-dihydroxy-1-methyl-17β-(1-oxo-2-hydroxyethyl)-4,6-estradien-3-one which may be represented by the following formula—

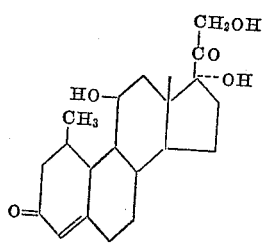

or

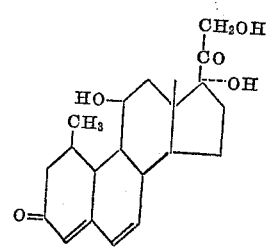

The 11β,17α-dihydroxy-1-methyl-17β-(1-oxo-2-hydroxyethyl)-4-estren-3-one or 11β,17α-dihydroxy-1-methyl-17β-(1-oxo-2-hydroxyethyl)-4,6-estradien-3-one obtained as above can be reacted with acylating agents such as lower alkanoic anhydrides, benzoic anhydride and the like to produce other 11β,17α-dihydroxy-1-methyl-17β-(1-oxo-2-acyloxyethyl)-4-estrene, 11β,17α-dihydroxy-1-methyl-17β-(1-oxo-2-acyloxyethyl)-4,6-estradiene-3-one such as 11β,17α - dihydroxy - 1 - methyl-17β-(1-oxo-2-propionoxyethyl)-4-estrene-3-one, 11β,17α - dihydroxy-1-methyl-17β-(1-oxo-2-propionoxyethyl)-4,6-estradiene-3-one, 11β,17α-dihydroxy-1-methyl-17β-(1-oxo-2-butyroxyethyl)-4-estrene-3 - one, 11β,17α-dihydroxy-1-methyl-17β-(1-oxo-2-butyroxyethyl) - 4,6 - estradiene - 3 - one, 11β,17α-dihydroxy-1-methyl-17β-(1-oxo-2-tertiarybutylacetoxyethyl)-4-estrene-3 - one, 11β, 17α-dihydroxy-1-methyl-17β-(1-oxo-2-tertiarybutylacetoxyethyl)-4,6-estradiene-3-one, 11β,17α-dihydroxy-1-methyl-17β-(1-oxo-2-benzoxyethyl)-4-estrene - 3-one, 11β,17α - dihydroxy-1-methyl-17β-(1-oxo-2-benzoxyethyl)-4,6-estradiene-3-one, and the like.

In accordance with one embodiment of this invention, it has been found that the rearrangement of 17α,21-diacetoxy-1,4-pregnadiene-3,11,20-trione to 3β,17α-diacetoxy-1-methyl-17β-(1 - oxo - 2 - acetoxyethyl)-1,3,5(10)-estratrien-11-one can be achieved without serious damage to the side chain if zinc chloride-acetic acid is used as a catalyst in acetic anhydride solution. At 25° C. conversion to the phenol is complete after four days. This reaction is unusual in that 1,17α-diacetoxy-4-methyl-17β-(1-oxo-2-acetoxyethyl) - 1,3,5(10) - estratrien-11-one would have been expected.

The hydrolysis of 3,17α-diacetoxy-1-methyl - 17β - (1-oxo - 2 - hydroxyethyl)-1,3,5(10)-estratrien-11-one is carried out under extremely mild conditions since the side chain decomposes rapidly on exposure to strong alkali.

The following examples are to be understood as illustrative only and are in no way to be construed as limiting the invention.

EXAMPLE 1

Preparation of 3,17α-Diacetoxy-1-Methyl-17β-(1-Oxo-2-Acetoxyethyl)-1,3,5(10)-Estratrien-11-One To a solution containing 2 grams of 17α,21-diacetoxy-1,4 - pregnadiene - 3,11,20 - trione prepared as described hereinafter, in 80 cc. of acetic anhydride is added 8 cc. of a 5% solution of anhydrous zinc chloride in glacial acetic acid. After purging with nitrogen, the solution is stored at 25° C. for four days. The reaction mixture is quenched in 1500 cc. ice water and stirred until the acetic anhydride has hydrolyzed. The 3,17α-diacetoxy-1-methyl-17β-(1-oxo-2-acetoxyethyl)-1,3,5(10)-estratrien-11-one is isolated by extraction with ether-benzene. The extract is washed successively with ice water, cold 5% sodium bicarbonate solution, ice water and then dried over anhydrous sodium sulfate. The solution is evaporated to dryness in vacuo and 2.2 grams of 3,17α-diacetoxy-1-methyl-17β-(1-oxo-2-acetoxyethyl)-1,3,5(10)-estratrien-11-one is recovered.

The 17α,21-diacetoxy-1,4-pregnadiene - 3,11,20 - trione used as a starting material in Example 1 is prepared starting with the known 17,21-diacetoxy-4-bromopregnane-3,11,20-trione in accordance with the following procedure:

To a suspension of 5.04 g. of 17α,21-diacetoxy-4-bromopregnane-3,11,20-trione in 90 ml. of acetic acid containing 1 ml. of a 0.95 N solution of hydrogen bromide in glacial acetic acid is added a solution of 1.55 g. of bromine in glacial acetic acid (10 ml.). The mixture is stirred as the bromine is added over twenty-two minute period, and the temperature remains at 25°±1° C. The bromine is rapidly consumed as evidenced by decolorization. To the mixture is then added 0.9 g. of anhydrous sodium acetate, and then, slowly, 500 ml. of water which causes the separation of a granular product. This crude 17α,21-diacetoxy-2,4-dibromopregnane - 3,11,20 - trione is collected on a filter and air-dried. The crude material melts at 132–138° C. with decomposition.

A mixture of 5 ml. of 2,4,6-collidine and 5 ml. of dimethylformamide is heated to 135° C., and a solution of 1.5 g. of 17α,21-diacetoxy-2,4-dibromopregnane-3,11,20-trione in 5 ml. of dimethylformamide is added. The resulting mixture is heated to reflux, and is refluxed for two hours. The mixture is then cooled in ice, causing the separation of collidine hydrobromide which is collected on a filter (0.87 g.). The filtrate deposits a yellow, granular, crude product upon pouring into ice water. The crude product is dissolved in chloroform and passed through a column containing activated carbon and a diatomaceous earth for partial purification. The glassy material remaining after evaporation of the chloroform is further purified by crystallization from methanol and then acetone-water and finally from ethyl acetate to give crystalling material, M.P. 214.5–216° C., the ethyl acetate molecular complex of 17α,21-diacetoxy-1,4-pregnadiene-3,11,20-trione.

EXAMPLE 2

Preparation of 3,17α-Dihydroxy-1-Methyl-17β-(1-Oxo-2-Hydroxyethyl)-1,3,5(10)-Estratrien-11-One 2.2 grams (.0045 mole) of 3,17α-diacetoxy-1-methyl-17β-(1-oxo-2-acetoxyethyl) - 1,3,5(10) - estratrien-11-one obtained above is dissolved in 100 cc. of methanol and a solution of 0.976 gram (0181 mole) of sodium methylate in 60 cc. methanol is added under an atmosphere of nitrogen. The alkaline solution is aged ten minutes at 25° C., cooled to 5° C., acidified with 36% acetic acid, diluted with 200 cc. ice water and concentrated in vacuo to a volume of 200 cc. After cooling at 5° C. for five minutes, 720 mgms. of impure 3,17α-dihydroxy-1-methyl-17β - (1-oxo-2-hydroxyethyl)-1,3,5(10)-estratrien-11-one is filtered off, M.P. 205–215° C. Further cooling for 1 hour of the filtrate gives a second crop (360 mgm.) of purer product melting at 245–246° C. This fraction is recrystallized from acetone to constant melting point 256–257° C.

3,17α-dihydroxy - 1 - methyl - 17β - (1-oxo-2-hydroxyethyl)-1,3,5(10)-estratrien-11-one is a crystalline solid freely soluble in half-normal potassium hydroxide solution in accordance with its formulation as a phenol. It gives a strongly positive tetrazolium test indicating the presence of the cortisone side chain. Upon paper strip chromatography, using methanol-formamide as the stationary phase and benzene or chloroform as the moving phase, the compound appears as a homogeneous single band.

Ultraviolet absorption in methanol:

| | $E_m$ |
|---|---|
| λ max.: | |
| 277 mu | 3020 |
| 283 (inflection) | 2630 |

Infra-red spectrum—in solid state shows hydroxyl absorption at 2.9–3.05μ, carbonyl at 5.85 and 5.95μ and —C=C at 6.2 and 6.25μ as in phenyl absorption. In ethanol solution, carbonyl absorption is observed at 5.81μ (shoulder) and 5.86μ, —C=C at 6.19 and 6.26; the intensity suggests oxygen substitution (phenolic) and two carbonyl functions ($C_{11}$ and $C_{20}$). There is no indication of conjugated carbonyl or acetate groups as in the starting material, namely, 17α,21-dihydroxy-1,4-pregnadiene-3,11,20-trione 17α,21-diacetate.

EXAMPLE 3

Preparation of 17α-Hydroxy-3-Methoxy-1-Methyl-17β-(1-Oxo-2-Hydroxyethyl)-1,3,5(10)-Estratrien-11-One 5 g. of 3,17α-dihydroxy - 1 - methyl-17β-(1-oxo-2-hydroxyethyl)-1,3,5(10)-estratrien-11-one is stirred with 100 ml. of ethereal diazomethane solution for 24 hours. After evaporation of the ethereal solution, there is obtained 17α-hydroxy - 3 - methoxy - 1 - methyl-17β-(1-oxo-2-hydroxyethyl)-1,3,5(10)-estratrien-11-one.

EXAMPLE 4

Preparation of 17α-Hydroxy-3-Methoxy-1-Methyl-17β-(1-Semi-Carbazono-2-Hydroxyethyl)-1,3,5(10)-Estratrien-11-One

5 grams of 17α-hydroxy-3-methoxy-1-methyl-17β-(1-oxo-2-hydroxyethyl)-1,3,5(10)-estratrien-11-one is refluxed with a solution of 5 g. of semicarbazide free base in 20 ml. of dimethylformamide in 20 ml. of chloroform until the blue tetrazolium test for 20-ketol side chain is negative (approximately 24 hours). On evaporation of the chloroform and dilution with water, the solid 17α-hydroxy - 3 - methoxy-1-methyl-17β-(1-semicarbazono-2-hydroxyethyl)-1,3,5(10)-estratrien-11-one is filtered off.

EXAMPLE 5

Preparation of 11β, 17α-Dihydroxy-3-Methoxy-1-Methyl-17-(1-Oxo-2-Hydroxyethyl)-1,3,5(10)-Estratriene

The 17α - hydroxy-3-methoxy-1-methyl-17β-(1-semicarbazono - 2 - hydroxyethyl)-1,3,5(10)-estratrien-11-one obtained above is dissolved in 100 ml. of tetrahydrofuran and 20 ml. of water. 10 grams of sodium borohydride is added to the reaction mixture and it is agitated for 2 hours at 20° C. After evaporation of the solvent, dilution of the residue with hydrochloric acid and water, and filtration, the residual product is crystallized from ethyl acetate to yield pure 11β,17α-dihydroxy-3-methoxy-1-methyl-17β-(1-oxo-2-hydroxyethyl)-1,3,5(10)-estratriene.

EXAMPLE 6

Preparation of 11β-Hydroxy-3-Methoxy-1-Methyl-17,20,20,21-Bis-(Dioxymethylene)-1,3,5(10)-Estratriene

To 3.0 g. of 11β,17α-dihydroxy-3-methoxy-1-methyl-17β-(1-oxo - 2 - hydroxyethyl)-1,3,5(10)-estratriene dissolved in 10 ml. of chloroform and 10 ml. of formalin is added 5 cc. of concentrated hydrochloric acid to form 11β - hydroxy - 3 - methoxy-1-methyl-17,20,20,21-bis-(dioxymethylene)-1,3,5(10)-estratriene. After 48 hours at room temperature, the acid is neutralized with 10% sodium hydroxide solution. The chloroform layer is separated and concentrated to dryness to yield 11β-hydroxy-3-methoxy - 1 - methyl-17,20,20,21-bis-(dioxymethylene)-1,3,5(10)-estratriene.

EXAMPLE 7

Preparation of 11β,17α-Dihydroxy-1-Methyl-17β-(1-Oxo-2-Hydroxyethyl)-4-Estren-3-One

The residue of 11β-hydroxy-3-methoxy-1-methyl-17,20,20,21-bis-(dioxymethylene)-1,3,5(10)-estratriene is dissolved in 100 ml. of ether and added to 100 ml. of liquid ammonia in a dry ice bath. With stirring 5 g. of lithium is added and the mixture stirred for 24 hours. Ethyl acetate is then added to discharge the excess lithium and the ammonia removed by evaporation. The residue from the reduction mixture is digested with water and filtered. To the residue is added 60% formic acid and the mixture stirred at 20° C. for 3 days to remove the enol ether and the bis-methylene ketal groupings. Chromatography of the product over activated magnesium silicate produces pure 11β,17α-dihydroxy-1-methyl-17β-(1-oxo-2-hydroxyethyl)-4-estren-3-one, which possesses anti-inflammatory activity.

EXAMPLE 8

Preparation of 11β,17α-Dihydroxy-1-Methyl-17β-(1-Oxo-2-Acetoxyethyl)-4-Estren-3-One

Treatment of the 11β,17α-dihydroxy-1-methyl-17β-(1-oxo-2-hydroxyethyl)-4-estren-3-one with pyridine and 1.1 molar equivalents of acetic anhydride at 60° for 1 hour yields substantially pure 11β,17α-dihydroxy-1-methyl-17β-(1-oxo-2-acetoxyethyl)-4-estren-3-one upon the addition of water. The precipitated product is collected by filtration and dried at 40° C.

EXAMPLE 9

Preparation of 3,17α-Diacetoxy-1-Methyl-17β-(1-Oxo-2-Acetoxyethyl)-1,3,5,(10),6-Estratetraen-11-One

To a solution of 100 mg. of 17α,21-diacetoxy-1-pregnatriene-3,11,20-trione (prepared as described hereinbelow) in 4 cc. of acetic anhydride is added 0.4 cc. of a 5% solution of anhydrous zinc chloride in glacial acetic acid. The solution is purged with nitrogen and stored at 25° C. for four days. It is then added to 80 cc. of ice water and stirred until the acetic anhydride had hydrolyzed. The 3,17α-diacetoxy-1-methyl-17β-(1-oxo-2-acetoxyethyl)-1,3,5(10)-6-estratetraen-11-one is separated by extraction into ether. The ether extract is washed with ice water, cold 5% sodium bicarbonate solution, ice water, and dried over anhydrous sodium sulfate. The solution is evaporated to dryness in vacuo resulting in 3,17α-diacetoxy - 1 - methyl-17β-(1-oxo-2-acetoxyethyl)-1,3,5(10),6-estratetraen-11-one.

The 17α,21-diacetoxy-1,4,6-pregnatriene-3,11,20-trione used as a starting material in Example 9 is prepared starting with the known 17α,21-dihydroxy-4-pregnene-3,11,20-trione 21-acetate in accordance with the following procedure:

200 mg. of p-toluene sulfonic acid is suspended in 80 cc. benzene and heated until 40 cc. are distilled off. Isopropanyl acetate (20 cc.) and 2 grams (.005 mole) of 17α,21-dihydroxy - 4 - pregnene-3,11,20-trione 21-acetate is added and the mixture heated at reflux temperature under nitrogen and protected from light for four hours. After cooling, 120 mgms. of anhydrous sodium acetate is added and the mixture concentrated under reduced pressure at 35°–40° C. The residue is triturated with 10 cc. dry benzene and reconcentrated. The residue contains 3,17α,21-triacetoxy-3,5-pregnadiene-11,20-dione.

The 3,17α,21-triacetoxy - 3,5 - pregnadiene-11,20-dione is dissolved in 20 cc. benzene and a solution of 895 mgms. (.005 mole) of N-bromosuccinimide in 20 cc. dimethyl formamide and 450 mgms. (.025 mole) of water added. After stirring for ninety minutes at room temperature, the residual N-bromosuccinimide is discharged by addition of a few drops of allyl alcohol. The reaction mixture is added to 200 cc. ice water and extracted with benzene. The benzene extract is washed with water, dried over sodium sulfate and concentrated in vacuo and 17α,21-diacetoxy - 6 - bromo - 4 - pregnene-3,11,20-trione.

The 17α,21-diacetoxy - 6 - bromo - 4 - pregnene-3,11,20-trione is dissolved in 5 cc. collidine and 12.5 cc. dimethyl formamide. The solution is heated at reflux temperature under nitrogen for two hours. After cooling, it is added to 150 cc. ice water containing 3.2 cc. of concentrated hydrochloric acid. The solid is filtered and washed with water until free of acid. The wet filter cake is dissolved in 50 cc. of chloroform, dried over sodium sulfate, decolorized with activated carbon and concentrated. One recrystallization from ethanol results in 17α,21-diacetoxy-4,6-pregnadiene-3,11,20-trione of good quality.

3.5 grams of p-toluene sulfonic acid is suspended in 500 cc. benzene and heated until 250 cc. has been distilled off. Isoproponyl acetate (600 cc.) and 15 grams (.034 mole of 17α,21-diacetoxy - 4,6 - pregnadiene-3,11,20-trione are added and the mixture heated at reflux temperature under nitrogen and protected from light for three hours. After cooling, 5.3 cc. triethylamine is added and the mixture concentrated under reduced pressure. The residue is dissolved in 50 cc. dry benzene, reconcentrated, the residue contains 3,17α,21-triacetoxy - 2,4,6 - pregnatriene-11,20-dione.

The crude 3,17α,21-triacetoxy - 2,4,6 - pregnatriene-11,20-dione from above is dissolved in 150 cc. benzene and a solution of 6.05 grams (.034 mole) of N-bromosuccinimide in 150 cc. dimethylformamide and 3.06 grams (0.17 mole) of water added. After stirring one hour at room temperature, reaction is complete (negative starch iodide test). The reaction mixture is added to 1500 cc.

ice water and extracted three times with 150 cc. each of benzene. The benzene extract is washed with water, dried over sodium sulfate and concentrated in vacuo. The residue contained 17α,21-diacetoxy-2-bromo-4,6-pregnadiene-3,11,20-trione.

The crude 17α,21-diacetoxy-2-bromo-4,6-pregnadiene-3,11,20-trione is added to a mixture of 40 cc. collidine and 100 cc. dimethylformamide and heated at reflux temperature under nitrogen for two hours. After cooling, the reaction mixture is added to 200 cc. of ice water and 38 cc. of concentrated hydrochloric acid. The solid is filtered and washed free of acid with water. The moist filter cake is dissolved in 150 cc. of chloroform, dried over sodium sulfate and concentrated in vacuo. The residue contains 17α,21-diacetoxy-1,4,6-pregnatriene-3,11,20-trione.

EXAMPLE 10

*Preparation of 3,17α-Dihydroxy-1-Methyl-17β-(1-Oxo-2-Hydroxyethyl)-1,3,5(10),6-Estratetraen-11-One*

The residue 3,17α-diacetoxy-1-methyl-17β-(1-oxo-2-acetoxyethyl)-1,3,5(10),6-estratetraen-11-one obtained above is dissolved in 5 cc. of methanol and a solution of 49 mgm. of sodium methylate in 5 cc. of methanol is added under an atmosphere of nitrogen. The alkaline solution is aged ten minutes at 25° C., cooled to 5° C., acidified with 36% acetic acid diluted with 20 cc. ice water and concentrated in vacuo to remove methanol. The steroid is extracted into chloroform. The extract is washed with ice water, dried over sodium sulfate and concentrated in vacuo. The residue 3,17α-dihydroxy-1-methyl-17β-(1-oxo-2-hydroxyethyl)-1,3,5(10),6-estratetraen-11-one (80 mgm.) gives a positive tetrazolium test. It is purified by partition chromatography on a strip of thick filter paper using methanolformamide as the stationary phase and developed with chloroform. Two bands are obtained. The more polar main band is eluted with methanol and concentrated. The residue is distributed between chloroform-water to remove residual formamide. The dried chloroform layer upon evaporation gives a product which shows ultra-violet absorption in methanol solution characteristic of 3,17α-dihydroxy-1-methyl-17β-(1-oxo-2-hydroxyethyl)1,3,5(10),6-estratetraen-11-one.

|  | $E_m$ |
|---|---|
| λ max. 222 mμ | 19,700 |
| 255 | 9,700 |

EXAMPLE 11

*Preparation of 17α-Hydroxy-3-Methoxy-1-Methyl-17β-(1-Oxo-2-Hydroxyethyl)-1,3,5(10),6-Estratetraen-11-One*

5 g. of 3,17α-dihydroxy-1-methyl-17β-(1-oxo-2-hydroxyethyl)-1,3,5(10),6-estratetraen-11-one is stirred with 100 ml. of ethereal diazomethane solution for 24 hours. After evaporation of the ethereal solution, there is obtained 17α-hydroxy-3-methoxy-1-methyl-17β-(1-oxo-2-hydroxyethyl)-1,3,5(10),6-estratetraen-11-one.

EXAMPLE 12

*Preparation of 17α-Hydroxy-3-Methoxy-1-Methyl-17β-(1-Semicarbazono-2-Hydroxyethyl)-1,3,5(10),6-Estratetraen-11-One*

5 grams of 17α-hydroxy-3-methoxy-1-methyl-17β-(1-oxo-2-hydroxyethyl)-1,3,5(10),6-estratetraen-11-one is refluxed with a solution of 5 g. of semicarbazide free base in 20 ml. of dimethylformamide and 20 ml. of chloroform until the blue tetrazolium test for 20-ketol side chain is negative (approximately 24 hours). On evaporation of the chloroform and dilution with water, the solid 17α-hydroxy-3-methoxy-1-methyl-17β-(1-semicarbazono-2-hydroxyethyl)-1,3,5(10),6-estratetraen-11-one is filtered off.

EXAMPLE 13

*Preparation of 11β,17α-Dihydroxy-3-Methoxy-1-Methyl-17β-(1-Oxo-2-Hydroxyethyl)-1,3,5(10),6-Estrateraene*

The 17α-hydroxy-3-methoxy-1-methyl-17β-(1-semicarbazono-2-hydroxyethyl)-1,3,5(10),6-estratetraen-11-one obtained above is dissolved in 100 ml. of tetrahydrofuran and 20 ml. of water. 10 g. of sodium borohydride is added to the reaction mixture and it is agitated for 2 hours at 20° C. After evaporation of the solvent, dilution of the residue with hydrochloric acid and water, and filtration, the residual product is crystallized from ethyl acetate to yield pure 11β,17α-dihydroxy-3-methoxy-1-methyl-17β-(1-oxo-2-hydroxyethyl)-1,3,5(10),6-estratetraen.

EXAMPLE 14

*Preparation of 11β-Hydroxy-3-Methoxy-1-Methyl-17,20,20,21-Bis-(Dioxymethylene)-1,3,5(10),6-Estratetraene*

To 3.0 g. of 11β,17α-dihydroxy-3-methoxy-1-methyl-17β-(1-oxo-2-hydroxyethyl)-1,3,5(10),6-estratetraene dissolved in 10 ml. of chloroform and 10 ml. of formalin is added 5 cc. of concentrated hydrochloric acid to form 11-hydroxy-3-methoxy-1-methyl-17,20,20,21-bis-(dioxymethylene)-1,3,4(10),6-estratetraene. After 48 hours at room temperature, the acid is neutralized with 10% sodium hydroxide solution. The chloroform layer is separated and concentrated to dryness to yield 11β-hydroxy-3-methoxy-1-methyl-17,20,20,21-bis(dioxymethylene)-1,3,5(10),6-estratetraen.

EXAMPLE 15

*Preparation of 11β,17α-Dihydroxy-1-Methyl-17β-(1-Oxo-2-Hydroxyethyl)-4,6-Estradien-3-One*

The residue of 11β-hydroxy-3-methoxy-1-methyl-17,20,20,21-bis-(dioxymethylene)-1,3,5(10),6-estratetraen, is dissolved in 100 ml. of ether and added to 100 ml. of liquid ammonia in a dry ice bath. With stirring, 5 g. of lithium is added and the mixture stirred for 24 hours. Ethyl acetate is then added to discharge the excess lithium and the ammonia removed by evaporation. The residue of reduced compound was digested with water and filtered. To the reduced compound is added 60% formic acid and the mixture stirred at 20° C. for 3 days to remove the enol ether and the bismethylene ketal groupings. Chromatography of the product over activated magnesium silicate produces pure 11β,17α-dihydroxy-1-methyl-17β-(1-oxo-2-hydroxyethyl)4,6-estradiene-3-one, which posses anti-inflammatory activity.

EXAMPLE 16

*Preparation of 11β,17α-Dihydroxy-1-Methyl-17β-(1-Oxo-2-Acetoxyethyl)-4,6-Estradiene-3-One*

11β,17α-dihydroxy-1-methyl-17β-(1-oxo-2-hydroxyethyl)-4,6-estradiene-3-one is heated with pyridine and 1.1 molar equivalents of acetic anhydride at 60° C. for 2 hours. On addition of water 11β,17α-dihydroxy-1-methyl-17β-(1-oxo-2-acetoxyethyl)-4,6-estradiene-3-one is obtained and collected by filtration.

It should be understood that various changes may be made in the present process as herein described without affecting the results attained. Thus, various modifications of conditions as to time, temperature, etc. and various changes in procedure differing from those herein given as illustrative of the preferred embodiments of this invention may be made without departing from the scope of our invention is to be determined in accordance with the prior art and the appended claims.

What is claimed is:
1. 3,17α-diacetoxy-1-methyl-17β-(1-oxo-2-acetoxyethyl)-1,3,5(10)-estratrien-11-one.
2. 3,17α-dihydroxy-1-methyl-17β-(1-oxo-2-hydroxyethyl)-1,3,5(10)-estratrien-11-one.
3. 17α-hydroxy-3-methyl-1-methyl-17β-(1-semicarbazono-2-hydroxyethyl)-1,3,5(10)-estratrien-11-one.

4. 11β - hydroxy-3-methoxy-1-methyl-17,20,20,21-bis-(dioxymethylene)-1,3,5(10)-estratriene.
5. 3,17α - diacetoxy - 1 - methyl-17β-(1-oxo-2-acetoxy-ethyl)-1,3,5(10),6-estratetraen-11-one.
6. 3,17α - dihydroxy - 1-methyl-17β-(1-oxo-2-hydroxy-ethyl)-1,3,5(10),6-estratetraen-11-one.
7. 17α - hydroxy-3-methoxy-1-methyl-17β-(1-oxo-2-hydroxyethyl)-1,3,5(10),6-estratetraen-11-one.
8. 17α - hydroxy-3-methoxy-1-methyl-17β-(1-semicarbazono-2-hydroxyethyl)-1,3,5(10),6-estratetraen-11-one.
9. 11β,17α-dihydroxy-3-methoxy-1-methyl-17β-(1-oxo-2-hydroxyethyl)-1,3,5(10),6-estratetraene.
10. 11β - hydroxy-3-methoxy-1-methyl-17,20,20,21-bis-(dioxymethylene)-1,3,5(10),6-estratetraene.

References Cited in the file of this patent

UNITED STATES PATENTS

| | | |
|---|---|---|
| 2,739,974 | Colton | Mar. 27, 1956 |
| 2,769,823 | Schneider et al. | Nov. 6, 1956 |
| 2,802,015 | Colton | Aug. 6, 1957 |
| 2,837,464 | Nobile | June 3, 1958 |
| 2,840,581 | Hogg et al. | June 24, 1958 |
| 2,863,862 | Djerassi et al. | Dec. 9, 1958 |
| 2,866,799 | Beyler et al. | Dec. 30, 1958 |
| 2,977,284 | Agnello et al. | Mar. 28, 1961 |

OTHER REFERENCES

Djerassi: J.A.C.S., vol. 72 (1950), p. 4542 relied on. Copy in Scientific Library.

Hershberg: J.A.C.S., vol 79 (1957) p. 502 relied on. Copy in Scientific Library.

Agnello et al.: J.A.C.S., vol 79 (1957), p. 1258 relied on. Copy in Scientific Library.

Wendler et al.: J. Am. Chem. Soc., vol. 73 (August 1951), pages 3818–3820. Copy in Patent Office Scientific Library.

Magerlein et al.: J. Am. Chem. Soc., vol. 79 (March 20, 1597), pages 1508 and 1509. Copy in Patent Office Scientific Library.